Sept. 11, 1951 H. M. RIVERO 2,567,728
ARTIFICIAL FISHING LURE
Filed May 1, 1950
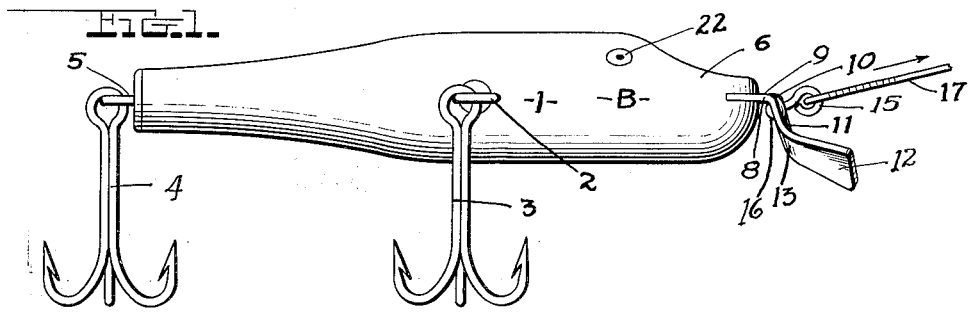
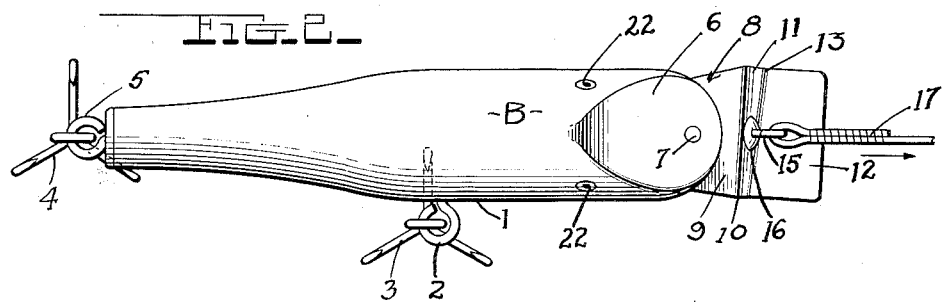
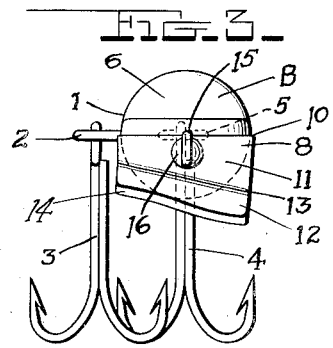
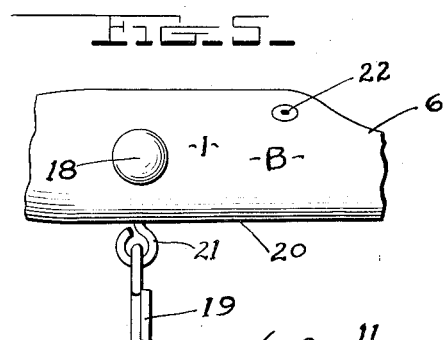
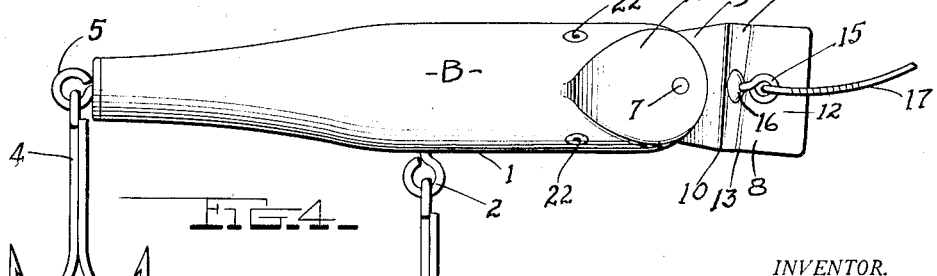
INVENTOR.
H. M. Rivero
attys.

Patented Sept. 11, 1951

2,567,728

UNITED STATES PATENT OFFICE 2,567,728

ARTIFICIAL FISHING LURE

Horace M. Rivero, Tampa, Fla.

Application May 1, 1950, Serial No. 159,284

8 Claims. (Cl. 43—42.47)

This invention relates to fishing lures or plugs, and more particularly to lures or plugs which are useful in "casting."

It is well known among those people who resort to fishing as a pastime, sport or for commercial purposes, that in order for a bait of the artificial lure type to be effective, it must closely simulate the appearance and movements of the live bait which it represents.

Generally, it is believed that a fish will more readily be attracted to a smaller fish or minnow, which has been injured. Consequently, a great deal of effort has been directed to creating an artificial bait that will closely simulate the actions of an injured minnow.

When injured, a fish, more particularly a fish of a suitable size to be used as bait, has a peculiar motion. The injured fish rises to a position close to the surface of the water and lies on its side, or back. Periodically it makes an effort to swim, at which time it turns back to a position in which its belly is down, as is normal for a healthy fish, and dives some distance below the surface of the water. It may swim in this position for some distance and then it tires and stops trying to swim. When it stops swimming it again rolls over on its side and rests until it feels able to make another attempt to right itself and swim further. Obviously a small fish or minnow going through the aforesaid movements is easy prey for the larger fish, which makes a habit of devouring these small fish or minnows, and their attention is readily attracted by the splashings of the minnow on the surface.

Many attempts have been made to simulate the actions of a crippled or injured minnow by both manufacturers and the sportsman who indulges in casting of artificial baits. However, up until this time, these artificial baits have failed to completely copy this action.

One form of artificial bait which attempts to copy the action of a crippled minnow comprises a substantially cigar or torpedo-shaped body, having a number of hooks suitably arranged thereon, and decorated to resemble a small fish. The body is weighted on one side, causing the bait to lie on its side when afloat, and is provided on each end with a spinner which rotates, and causes a splash when the bait is pulled through the water. This type of bait is very popular among fishermen, but it fails to completely simulate the action of a crippled minnow, after which it was named, in that it lies on its side at all times and never imitates the crippled minnow's attempt to swim, whereby he turns back to an upright position.

Therefore, an object of this invention is to provide an artificial bait, which more closely resembles and acts like a live minnow or small fish.

Another object is to provide an artificial bait which will closely simulate the movements of an injured minnow or small fish.

Another object is to provide an artificial bait adapted to lie on its side when there is no pull on the fishing line to cause forward motion of the lure.

A further object is to provide an artificial bait, which will turn from its side to a normal position of a swimming fish.

Another object is to provide an artificial bait which will turn from its side to a normal position of a swimming fish, responsive to pull on the fishing line, causing forward motion of the bait and at the same time effecting a dive to a position below the surface of the water.

A still further object of this invention is to provide an artificial bait or plug with a weight displaced transversely from the longitudinal axis of the body of the lure to cause the body to turn on its longitudinal axis approximately 90°, when the lure is at rest in the water, and having a shovel nose of such shape as to cause the body to turn back approximately 90°, responsive to retrieving of the lure.

Other features, advantages and capabilities will be apparent from the following detail description and the accompanying illustration of the preferred forms of this invention, and the novel features thereof defined in the appended claims.

In the drawing:

Fig. 1 is a view in side elevation of an artificial fishing bait or plug, in the position normally assumed by the bait or plug as it is being retrieved in the direction of the arrow;

Fig. 2 is a view in top plan of the plug, and in the position normally assumed by the plug as it is being retrieved in the direction of the arrow.

Fig. 3 is a view in front elevation of the plug, and in the position normally assumed by the plug as it is being retrieved;

Fig. 4 is a view in side elevation of the plug, in the position normally assumed when the plug is at rest, or not being retrieved; and Fig. 5 is a fragmentary view in side elevation of a modified form of the invention and in the position normally assumed by the plug, as it is being retrieved.

Like reference characters designate corresponding parts in the several figures of the drawing, wherein B generally denotes the body portion of the lure, the particular form of body member forming no part of the present invention. The form of body shown is more or less conventional, and obviously the body B may take the form of an articulated body, as disclosed in Letters Patent No. 2,069,972, dated February 9, 1937, to F. H. Schroeder, or any other form desirable, without departing from the spirit of this invention.

Suitably secured to the side 1 of the lure body B, as by means of a screw eye 2, is a hook 3 of any suitable type, and a similar hook 4 is likewise attached to the rearmost end of the lure body, as by means of a screw eye 5.

The location of the hook 3 with respect to the lure body B is such that the combined weight of the screw eye 2 and the hook 3 overbalances the side 1 of the otherwise transversely balanced lure body in such a manner as to cause the side 1 of said lure body B to be turned downwardly, as shown to best advantage in Fig. 4, when the lure is freely floating on the surface of the water.

Suitably mounted on the nose 6 of the lure body B, as by means of a screw 7 or the like, is a so-called "shovel nose," generally denoted at 8.

Said shovel nose 8 comprises a flat metal plate extending forwardly on a horizontal plane with respect to the lure body B to form a flat horizontally disposed shoulder portion 9. At a suitable distance forwardly of the nose 6 of the body B, the shovel nose plate 8 is turned downwardly as at 10 to form a downwardly and slightly forwardly extended flat portion 11. The end portion 12 of the shovel nose plate 8 is bent forwardly as at 13, the bend 13 being tilted at a slight angle from the horizontal transversely of the body, as is best shown in Fig. 3, and the end portion 12 being correspondingly slanted at substantially the same angle, as is best shown in Figs 1 and 3. The end portion 12 of the shovel nose plate 8 is also directed slightly downwardly from a horizontal plane longitudinally of the body B, as is best shown in Fig. 1. The flat, angularly disposed, forwardly and slightly downwardly directed end portion 12 of the shovel nose plate 8 is slightly curved downwardly from its front left-hand corner 14, as viewed in Fig. 3.

The construction of this shovel nose plate 8 may take other specific forms than the form shown and described, and may be formed as an integral part of the body B, instead of as a separately attached plate, but its function is to cause the lure body to dive for some distance below the surface of the water, and at the same time cause rotation of the body responsive to the pressure of the water on the faces of the shovel nose when the lure is being retrieved.

A means is provided for connecting the lure to a fishing line 17, said means preferably comprising an eye member 15 which is swivel-connected at 16 to the forwardly and slightly downwardly projecting flat portion 11 of the shovel nose plate 8.

A modified form of the invention is shown in Fig. 5, wherein a weight 18 is suitably attached to, or embedded in the side 1 of the lure body B. A conventional hook 19 is attached to the bottom or under-side 20 of the body B, as by means of a screw eye 21. Otherwise, the construction may be identical with that of Figs. 1 to 4.

In use, the lure is cast, as is customary, to a desired point in the water. The lure is allowed to remain at rest, or freely floating, for a moment, during which moment the weight of the hook 3, in Figs. 1 to 4 inclusive, overbalances the otherwise transversely balanced lure body B, and the lure rests on its side 1, as shown in Fig. 4, said side being characterized by the general configuration of the lure body, and the artificial eyes 22 suitably positioned thereon, and by appropriate coloring or decoration. The lure is then retrieved at a proper rate of speed. As the lure is being retrieved, the shovel nose 8 causes the lure body to turn on its longitudinal axis, approximately 90°, or to an upright position. The turning or rotating motion is effected by the water pressure on the angularly disposed and slightly curved end portion 12, and the downwardly and slightly forwardly extending flat portion 11 of the shovel nose 8, as the lure is being retrieved. The angular relation of the end portion 12 causes the lure to dive for some distance below the surface of the water simultaneously with the effecting of rotation of the lure body B. Retrieving of the lure is halted after the desired distance has been covered, at which time the inherent buoyancy of the lure causes it to rise to the surface. As the lure rises to the surface of the water, it turns on its side 1, as described, and remains in this position until the lure is again retrieved for the desirable distance, and so on.

It must be understood that the lure should be retrieved at a proper rate of speed that will cause just the amount of rotative urgency as is required to overcome the weight of the hook 3, but if a complete rotation is desired, as is sometimes the case, the lure may be retrieved at a greater rate of speed than is required when only a 90° rotation is desired.

It is apparent that the number and arrangement of the hooks need not be limited to the number and arrangement shown and described. Obviously, a plurality of hooks may be applied to the side 1, and a lesser number of hooks applied to the opposite side of the lure body B, and the lure would still be normally overbalanced on the side 1.

The action of the modified form of lure shown in Fig. 5 is similar to the action hereinbefore described, except that the overbalancing of the side 1 of the body is effected by the weight 18, said weight 18 being sufficiently heavy to overcome the weight of the hook 19 to such an extent as to cause a 90° rotation of the lure body. A plurality of weights may be used as well as a plurality of hooks, just so long as the weight or weights are sufficiently heavy to overcome the weight of the hook or hooks.

While the specific details of the preferred embodiments of this invention have been herein shown and described, the invention is not confined thereto, as other changes and alterations may be made without departing from the spirit thereof, as defined by the appended claims.

What is claimed is:

1. An artificial fishing lure of the class described, comprising a lure body, means carried by one side of said lure body for causing the lure body to normally assume a position with said side directed downwardly, and means at the nose of said lure body for effecting rotation of the lure body to an upright position normal for a swimming fish responsive to forward motion of said body, said last mentioned means comprising a shovel nose having a water pressure responsive portion disposed at a slight angle transversely inclining downwardly from one side of the shovel nose to the opposite side thereof when the lure body is in an upright position.

2. An artificial fishing lure of the class described, comprising a lure body, means carried by one side of said lure body for causing the lure body to normally assume a position with said side directed downwardly, and means at the nose of said lure body for effecting rotation of the lure body to an upright position normal for a swimming fish, and simultaneously effecting a diving action of the lure body aforesaid responsive to forward motion of said body, said last mentioned means comprising a shovel nose having a water pressure responsive portion disposed at a slight angle transversely inclining downwardly from one side of the shovel nose to the opposite side thereof, said portion also being inclined slightly forwardly and downwardly when the lure body is in an upright position.

3. An artificial fishing lure as defined in claim 2, wherein the means carried by one side of the lure body for causing the lure body to normally assume a position with said side downwardly, comprises a fish hook.

4. An artificial fishing lure as defined in claim 2, wherein the means carried by one side of the lure body for causing the lure body to normally assume a position with said side directed downwardly comprises a weight member.

5. An artificial fishing lure as claimed in claim 2, wherein the means carried by one side of the lure body for causing the lure body to normally assume a position with said side directed downwardly comprises a weight member, and the shovel nose comprises a plate member having a portion secured to the nose of said lure body.

6. An artificial fishing lure of the class described, comprising a lure body, means carried by said lure body normally overbalancing the same on one side of its longitudinal axis for causing the lure body to assume one position, and means also carried by said lure body for effecting movement of said lure body to a second position overcoming the overbalancing action of the first-mentioned means responsive to forward motion of said body, the means carried by the lure body for effecting movement of said lure body to the second position comprising a shovel nose, said shovel nose being in the form of a plate member having a portion secured to the nose of said lure body, said plate member extending forwardly, and then being turned downwardly and slightly forwardly, and the free end of the plate member aforesaid then extending forwardly and slightly downwardly and being inclined at a slight angle transversely to said portion of the plate member secured to the nose of the lure body.

7. An artificial fishing lure of the class described, comprising a lure body, means carried by said lure body normally overbalancing the same on one side of its longitudinal axis for causing the lure body to assume one position, and means also carried by said lure body for effecting movement of said lure body to a second position overcoming the overbalancing action of the first-mentioned means responsive to forward motion of said body, the means carried by the lure body for effecting movement of said lure body to the second position comprising a shovel nose, said shovel nose being in the form of a plate member having a portion secured to the nose of said lure body, said plate member extending forwardly, and then being turned downwardly and slightly forwardly, the free end of the plate member aforesaid then extending forwardly and slightly downwardly and being inclined at a slight angle transversely to said portion of the plate member secured to the nose of the lure body, said forwardly and slightly downwardly extending free end of the plate member aforesaid being slightly curved downwardly towards one corner thereof, and swivel means carried by said shovel nose for connection with a fishing line.

8. An artificial fishing lure of the class described, comprising a lure body, said lure body being decorated in a manner to represent a live minnow, fish hook means secured on one side of the lure body for overbalancing the otherwise balanced lure body on the side to which said fish hook means is secured, and a shovel nose at the nose of said lure body, said shovel nose comprising a substantially longitudinally directed angularly disposed plate member, said shovel nose carrying swivel means for connecting a fishing line thereto, and having a water pressure responsive portion disposed at a slight angle transversely inclining downwardly from one side of the shovel nose to the opposite side thereof when the lure body is in an upright position adapted to overcome the overbalance of the one side of the lure body aforesaid responsive to retrieving of the lure, and the overbalancing of one side of the lure causing the lure to assume a position with the overbalanced side down, when the lure is freely floating.

HORACE M. RIVERO.

REFERENCES CITED

The following references are of record in the file of this patent:

UNITED STATES PATENTS

| Number | Name | Date |
|---|---|---|
| 1,352,054 | Dills | Sept. 7, 1920 |
| 1,736,403 | Heddon | Nov. 19, 1939 |
| 2,262,974 | Steiner | Nov. 18, 1941 |
| 2,482,309 | Wilson | Sept. 20, 1949 |